(12) United States Patent
Kim

(10) Patent No.: US 11,349,170 B2
(45) Date of Patent: May 31, 2022

(54) SECONDARY BATTERY INCLUDING INSULATION SHEET

(71) Applicant: SAMSUNG SDI CO., LTD., Yongin-si (KR)

(72) Inventor: Dae Kyu Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 157 days.

(21) Appl. No.: 16/332,765

(22) PCT Filed: Sep. 20, 2016

(86) PCT No.: PCT/KR2016/010476
§ 371 (c)(1),
(2) Date: Mar. 12, 2019

(87) PCT Pub. No.: WO2018/056475
PCT Pub. Date: Mar. 29, 2018

(65) Prior Publication Data
US 2019/0363315 A1    Nov. 28, 2019

(51) Int. Cl.
*H01M 10/34* (2006.01)
*H01M 50/155* (2021.01)
(Continued)

(52) U.S. Cl.
CPC ..... *H01M 50/155* (2021.01); *H01M 10/0525* (2013.01); *H01M 50/183* (2021.01); *H01M 50/342* (2021.01); *H01M 2200/20* (2013.01)

(58) Field of Classification Search
CPC .... H01M 2/0482; H01M 2/08; H01M 2/1235; H01M 2/345; H01M 2/34; H01M 2/47;
(Continued)

(56) References Cited

U.S. PATENT DOCUMENTS 4,567,121 A * 1/1986 Gilmour ............. H01M 50/147
429/181
6,322,921 B1   11/2001 Iwaizono et al.
(Continued)

FOREIGN PATENT DOCUMENTS

CN         103647031 A    3/2014
KR   10-2018-0109949 A   12/2008
(Continued)

OTHER PUBLICATIONS

Extended European Search Report for corresponding European Patent Application No. 16916849.9, dated Mar. 17, 2020, 7 pages.
(Continued)

*Primary Examiner* — Raymond Alejandro
(74) *Attorney, Agent, or Firm* — Lewis Roca Rothgerber Christie LLP

(57) ABSTRACT

A secondary battery in which an insulation sheet is inserted between a cap-up and a case, thereby increasing safety, is provided. The secondary battery includes: an electrode assembly; a case for receiving the electrode assembly; a cap assembly coupled to an upper part of the case; and a gasket interposed between the cap assembly and the case. The cap assembly includes: a cap-up; a safety vent installed at a lower part of the cap-up and extending to an upper part of the cap-up so as to surround a periphery of the cap-up; and an insulation sheet positioned at an upper part of the safety vent extending to the upper part of the cap-up.

7 Claims, 6 Drawing Sheets

(51) Int. Cl.
*H01M 10/0525* (2010.01)
*H01M 50/183* (2021.01)
*H01M 50/342* (2021.01)

(58) Field of Classification Search
CPC .......... H01M 2/06; H01M 2/26; H01M 2/266; H01M 2/30; H01M 2/307; H01M 10/0525; H01M 2200/20
See application file for complete search history.

(56) References Cited

U.S. PATENT DOCUMENTS

| | | | |
|---|---|---|---|
| 8,986,876 B2 | 3/2015 | Kim | |
| 9,748,529 B2 | 8/2017 | Jung | |
| 2010/0159288 A1* | 6/2010 | Kim | H01M 2/1235 429/7 |
| 2012/0301757 A1* | 11/2012 | Yokoyama | H01M 2/02 429/82 |
| 2014/0272476 A1* | 9/2014 | Park | H01M 50/581 429/7 |
| 2015/0194644 A1* | 7/2015 | Jung | H01M 2/08 429/56 |

FOREIGN PATENT DOCUMENTS

| | | |
|---|---|---|
| KR | 10-2010-0070677 A | 6/2010 |
| KR | 10-1043346 B1 | 6/2011 |
| KR | 10-2015-0082748 A | 7/2015 |
| KR | 10-2016-0035424 A | 3/2016 |

OTHER PUBLICATIONS

Chinese Office action issued in corresponding application No. 201680089251.9, dated Feb. 2, 2021 (9 pages), with full English Translation (12 pages).

* cited by examiner

SECONDARY BATTERY INCLUDING INSULATION SHEET

CROSS-REFERENCE TO RELATED APPLICATION(S)

This application is a National Phase Patent Application and claims priority to and the benefit of International Application Number PCT/KR2016/010476, filed on Sep. 20, 2016, the entire contents of which is incorporated herein by reference.

TECHNICAL FIELD

The present invention relates to a secondary battery.

BACKGROUND ART

In a case where a secondary battery is used in an abnormal state, like a short-circuited or over-discharged state, an internal temperature of the battery may rise or internal gases may be generated, resulting in an increased pressure of the battery.

For example, a lithium secondary battery may be over-charged to release gases, such as carbon dioxide or carbon monoxide, during decomposition of electrolyte, so that the internal pressure of the battery may increase. In addition, when over-current flows in the battery due to over-discharge or short-circuiting, the internal temperature of the battery may rise to convert the electrolyte into gases. Accordingly, when the internal pressure and temperature of the battery are increased, a serious safety-related problem may be caused particularly due to a risk of ignition, resulting in the overall deterioration in view of performance and life characteristics of the battery.

Technical Problems to be Solved

The present invention provides a secondary battery in which an insulation sheet is inserted between a cap-up and a case, thereby increasing safety.

Technical Solutions

In accordance with an aspect of the present invention, the above and other objects can be accomplished by providing a secondary battery including an electrode assembly, a case for receiving the electrode assembly, a cap assembly coupled to an upper part of the case, and a gasket interposed between the cap assembly and the case, wherein the cap assembly includes a cap-up, a safety vent installed at a lower part of the cap-up and extending to an upper part of the cap-up so as to surround a periphery of the cap-up, and an insulation sheet positioned at an upper part of the safety vent extending to the upper part of the cap-up.

In addition, the insulation sheet may be interposed between the safety vent upwardly extending from the cap-up and the gasket.

In addition, the insulation sheet may be formed by anodizing an aluminum sheet.

In addition, the insulation sheet may be adhered to the safety vent using an adhesion member.

In addition, the insulation sheet may be adhered to the safety vent by welding.

In addition, the secondary battery may further include an upper insulation member interposed between the cap-up and the safety vent upwardly extending from the cap-up, wherein the insulation sheet is coupled to the upper insulation member.

Here, the upper insulation member may include a first region positioned between the cap-up and the safety vent, a second region positioned inside the first region and formed to be higher than the first region, and a third region positioned inside the second region and formed to be higher than the second region, and the insulation sheet is coupled to a stepped portion between the second region and the third region.

In addition, the insulation sheet may be formed to extend from an upper part of the safety vent to the upwardly protruding part of the cap-up.

Here, a plurality of cutting grooves may be formed in an inner peripheral edge of the insulation sheet.

In accordance with another aspect of the present invention, there is provided a secondary battery including an electrode assembly, a case for receiving the electrode assembly, a cap assembly coupled to an upper part of the case, and a gasket interposed between the cap assembly and the case, wherein the cap assembly comprises a cap-up, a safety vent installed at a lower part of the cap-up, and an insulation sheet positioned at an upper part of the cap-up and interposed between the cap-up and the gasket, and the insulation sheet is formed by anodizing an aluminum sheet.

Advantageous Effects

As described above, in the secondary battery according to an embodiment of the present invention, an insulation sheet is formed between the cap-up and the case, thereby insulating the cap-up and the case from each other even when the gasket is burnt or melted by heat generated during an internal short-circuit. Accordingly, the secondary battery of the present invention can have improved safety.

BEST MODE FOR CARRYING OUT THE INVENTION

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

Figure 1:
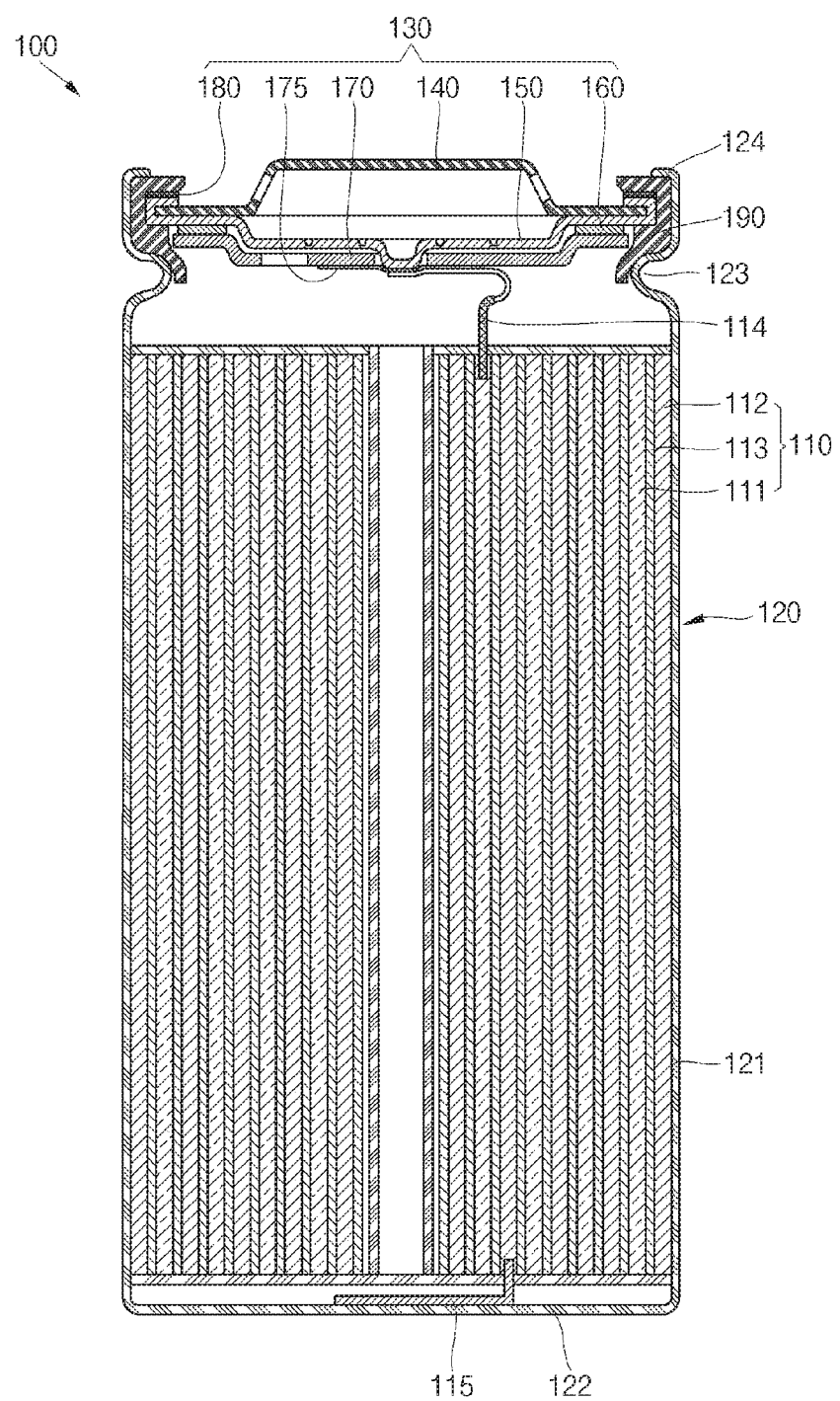
FIG. 1 is a cross-sectional view of a secondary battery according to an embodiment of the present invention.
Figure 2:
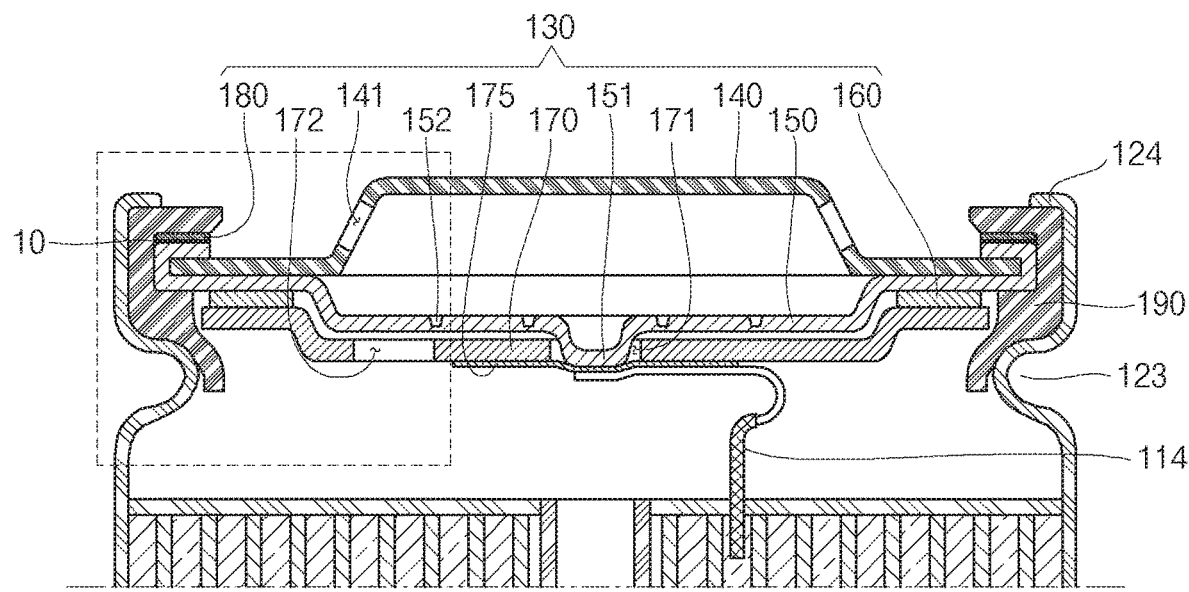
FIGS. 2 and 3 are enlarged cross-sectional views of a cap assembly shown in FIG. 1.
Figure 3:
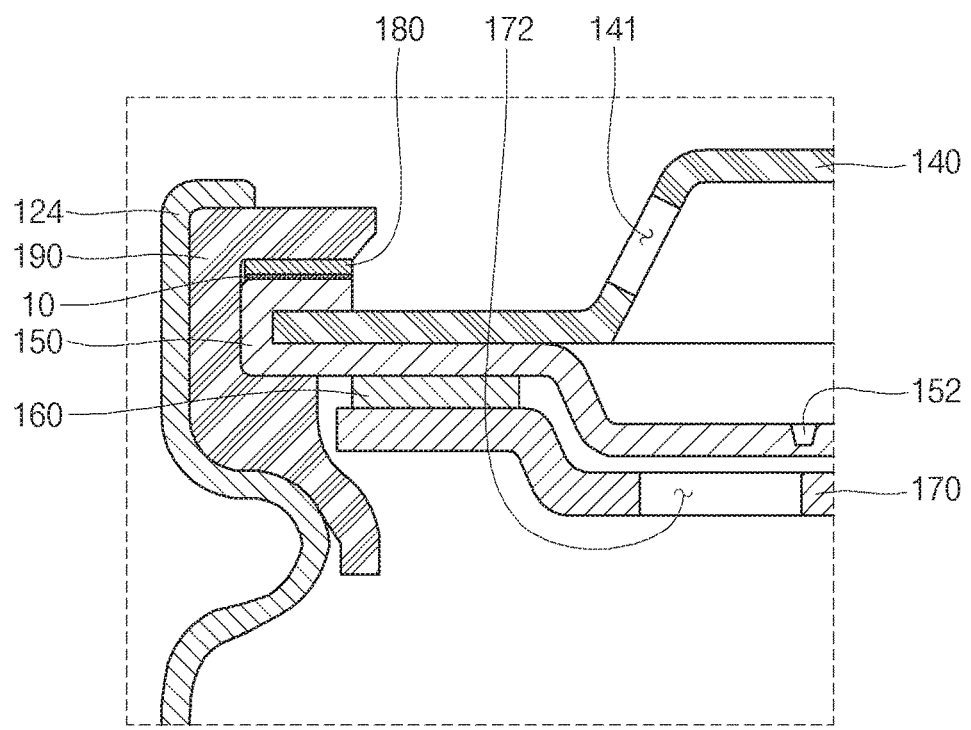

FIG. 1 is a cross-sectional view of a secondary battery according to an embodiment of the present invention. FIGS. 2 and 3 are enlarged cross-sectional views of a cap assembly shown in FIG. 1.

Referring to FIGS. 1 to 3, the secondary battery 100 according to an embodiment of the present invention includes an electrode assembly 110, a case 120 for receiving the electrode assembly 110, a cap assembly 130 coupled to an upper part of the case 120, and a gasket 190 interposed between the cap assembly 130 and the case 120.

The electrode assembly 110 includes a first electrode 111, a second electrode 112 and a separator 113 interposed between the first electrode 111 and the second electrode 112. The electrode assembly 110 may be formed by winding a stack of the first electrode 111, the separator 113 and the second electrode 112 in a jelly-roll configuration. Here, the first electrode 111 may operate as a cathode and the second electrode 112 may operate as an anode. The first electrode tab 114 is connected to the cap assembly 130 on the electrode assembly 110, and the second electrode tab 115 is connected to a bottom surface of the case 120 under the electrode assembly 110.

The first electrode 111 is formed by coating a first electrode active material, such as a transition metal oxide, on a first electrode current collector formed as a metal foil made of aluminum, etc. A first electrode non-coating portion without a first electrode active material coated thereon is formed on the first electrode 111, and a first electrode tab 114 is attached to the first electrode non-coating portion. The first electrode tab 114 has one end electrically connected to the first electrode 111 and the other end upwardly protruding from the electrode assembly 110 and electrically connected to the cap assembly 130.

The second electrode 112 is formed by coating a second electrode active material, such as graphite or carbon, on a second electrode current collector formed as a metal foil made of copper or nickel. A second electrode non-coating portion without a second electrode active material coated thereon is formed on the second electrode 112, and a second electrode tab 115 is attached to the second electrode non-coating portion. The second electrode tab 115 has one end electrically connected to the second electrode 112 and the other end downwardly protruding from the electrode assembly 110 and electrically connected to the bottom surface of the case 120.

The separator 113 positioned between the first electrode 111 and the second electrode 112 may prevent a short-circuit from occurring therebetween while allowing lithium ions to move. The separator 113 may be made of polyethylene, polypropylene, or a composite film of polyethylene and polypropylene.

The case 120 may include a side plate 121 that is shaped of a cylinder having a predetermined diameter to form a space for receiving the electrode assembly 110, and a bottom plate 122 sealing a bottom portion of the side plate 121. A top-end opening of the case 120 is opened to allow the electrode assembly 110 to be inserted into the case 120 therethrough to then be sealed. In addition, a beading part 123 for preventing the electrode assembly 110 from moving is formed at an upper portion of the case 120. In addition, a crimping part 124 for fixing the cap assembly 130 and the gasket 190 is formed at the topmost part of the case 120.

The cap assembly 130 includes a cap-up 140, a safety vent 150, an insulator 160, a cap-down 170 and an insulation sheet 180.

The cap-up 140 may have a top portion convexly formed to be electrically connected to an external circuit. In addition, the cap-up 140 may include a gas discharge hole 141 formed therein to provide a passageway for discharging internal gases generated in the case 120. The cap-up 140 is electrically connected to the electrode assembly 110 and transfers electric current generated in the electrode assembly 110 to the external circuit.

The safety vent 150 is formed as a circular plate shaped to correspond to the cap-up 140. A protrusion part 151 that protrudes downwardly is formed at the center of the safety vent 150. The safety vent 150 is electrically connected to a sub-plate 175 fixed to a bottom surface of the cap-down 170 using the protrusion part 151 penetrating the throughhole 171 of the cap-down 170. Here, the protrusion part 151 of the safety vent 150 and the sub-plate 175 may be welded to each other by, for example, laser welding, ultrasonic welding, resistance welding or equivalents thereof. In addition, a notch 152 for guiding rupture of the safety vent 150 is formed on an outer peripheral edge of the protrusion part 151.

The outer peripheral edge of the safety vent 150 is brought into close contact with portions of the cap-up 140, except for the upwardly protruding part of the cap-up 140. That is to say, the outer peripheral edge of the safety vent 150 and an outer peripheral edge of the cap-up 140 come into contact with each other. In addition, the edge of the safety vent 150 is formed to upwardly extend from the cap-up 140 while surrounding the cap-up 140. The safety vent 150 discharges the internal gases while cutting off the current when an abnormal internal pressure is generated in the case 120. If the internal pressure of the case 120 exceeds an operation pressure of the safety vent 150, the protrusion part 151 is upwardly moved by the gases discharged through a gas discharge hole 172 of the cap-down 170 to then be electrically separated from the sub-plate 175. Here, the sub-plate 175 is electrically separated from the safety vent 15 such that the protrusion part 151 is torn at its welded portion. In addition, if the internal pressure of the case 120 exceeds a rupture pressure higher than the operation pressure of the safety vent 150, the notch 152 of the safety vent 150 is ruptured, thereby preventing the secondary battery 100 from exploding.

The insulator 160 is interposed between the safety vent 150 and the cap-down 170 to insulate the safety vent 150 and the cap-down 170 from each other. In detail, the insulator 160 is interposed between the outer peripheral edge of the safety vent 150 and the outer peripheral edge of the cap-down 170. The insulator 160 may be made of a resin material, such as polyethylene (PE), polypropylene (PP) or polyethylene terephthalate (PET).

The cap-down 170 is shaped of a circular plate. A throughhole 171 is formed at the center of the cap-down 170, and the protrusion part 151 of the safety vent 150 penetrates the throughhole 171. In addition, a gas discharge hole 172 is formed at one side of the cap-down 170, and the sub-plate 175 is coupled to a lower part of the cap-down 170. The gas discharge hole 172 functions to release internal gases when an excessive internal pressure is generated in the case 120. Here, the protrusion part 151 of the safety vent 150 is elevated by the gases released through the gas discharge hole 172, thereby separating the protrusion part 151 from the sub-plate 175. The sub-plate 175 is welded between the protrusion part 151 of the safety vent 150 penetrating the throughhole 171 of the cap-down 170 and the first electrode tab 114. Accordingly, the sub-plate 175 may electrically connect the first electrode tab 114 and the safety vent 150 to each other.

The insulation sheet 180 is formed as a ring-shaped plate and is mounted on the cap-up 140. In detail, the insulation sheet 180 is mounted on the edge of the cap-up 140. Therefore, the insulation sheet 180 is positioned on the safety vent 150 surrounding the edge of the cap-up 140. That is to say, the insulation sheet 180 is positioned on the cap-up 140 and is interposed between the safety vent 150 and the gasket 190. Here, the insulation sheet 180 may be fixed to the safety vent 150 positioned at the edge of the cap-up 140 through the adhesion member 10. In addition, after being mounted on the safety vent 150 positioned at the edge of the cap-up 140, the insulation sheet 180 may be fixed to the cap-up 140 by the gasket 190 and the crimping part 124 of the case 120 without using an adhesion member. In addition, the insulation sheet 180 may be fixed to the safety vent 150 positioned at the edge of the cap-up 140 by laser welding, ultrasonic welding, resistance welding or an equivalent thereof.

The insulation sheet 180 may be formed by anodizing an aluminum sheet. Here, the anodizing is a process for forming an oxide layer by oxidizing a surface of a metal plate. In general, the most typically used material in anodizing is aluminum (Al), and other metals, including manganese (Mn), zinc (Zn), titanium (Ti), hafnium (Hf), niobium (Nb) and so on, may also be used. The thus formed oxide layer may have very high hardness and may be excellent in view of corrosion resistance and wear resistance. For example, the insulation sheet 180 may be completed such that an aluminum sheet is inserted into an electrolyte solution and electrodes are applied thereto, making a surface of the aluminum sheet react with oxygen to cause gradual oxidation to the surface of the aluminum sheet, and forming aluminum oxide ($Al_2O_3$) on the oxidized portion of the aluminum sheet, that is, forming an oxide layer. Here, the oxide layer may be formed on one surface of the aluminum sheet.

In general, when a short-circuit occurs to the secondary battery 100, the internal pressure of the secondary battery 100 may increase, so that the internal gases are released through the gas discharge hole 172 of the cap-down 170. Here, the protrusion part 151 of the safety vent 150 is elevated by the released gases, thereby cutting off electrical current by electrically disconnecting the protrusion part 151 of the safety vent 150 from the sub-plate 175. However, the gasket 190 positioned between the cap-up 140 (and/or the safety vent 150) and the case 120 may be burnt or melted down due to heat generated due to the short-circuit occurring to the secondary battery 100, so that a short-circuit may be generated between the cap-up 140 (and/or the safety vent 150) and the case 120.

According to the present invention, the insulation sheet 180 is installed on the safety vent 150 positioned at the edge of the cap-up 140, thereby insulating the cap-up 140 (and/or the safety vent 150) and the case 120 from each other by the insulation sheet 180 even if the gasket 190 is burnt or melted down by the heat generated when a short-circuit occurs to the secondary battery 100. Therefore, the secondary battery 100 according to the present invention can having improved safety by perfectly cutting off the electrical current flowing therein even during the short-circuit.

The gasket 190 is installed at the top-end opening of the case 120. That is to say, the gasket 190 is assembled such that it is brought into close contact with the peripheral edges of the cap-up 140 and the safety vent 150, and an inside of the case 120. The gasket 190 may be made of a resin material, such as polyethylene (PE), polypropylene (PP) or polyethylene terephthalate (PET). The gasket 190 may prevent the cap assembly 130 from being separated from the case 120.

Figure 4:
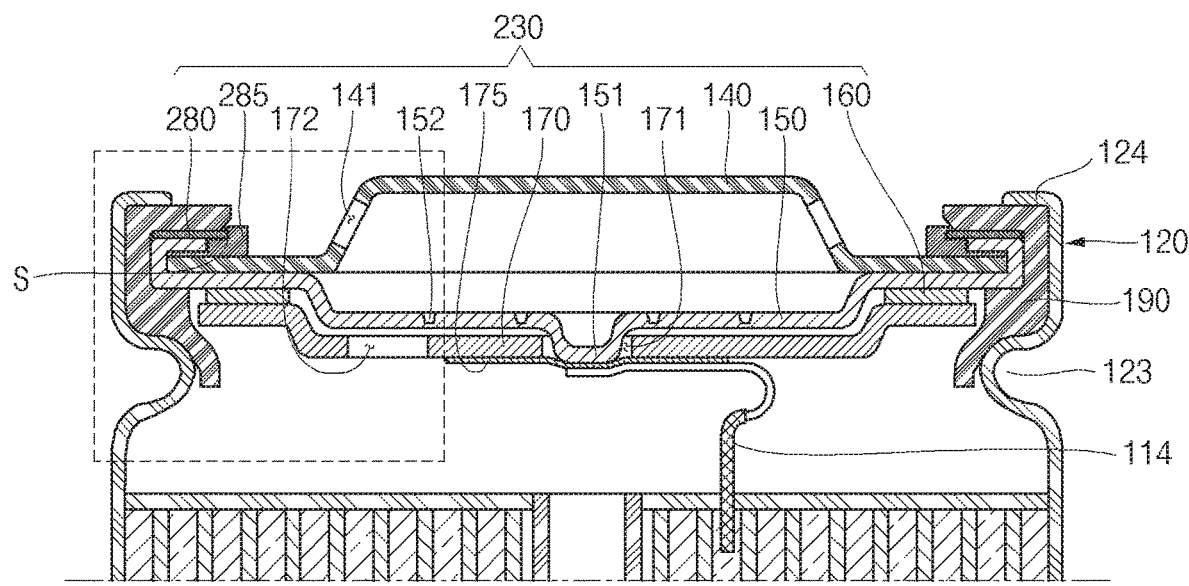
FIGS. 4 and 5 are partially cross-sectional views of a secondary battery according to another embodiment of the present invention.
Figure 5:
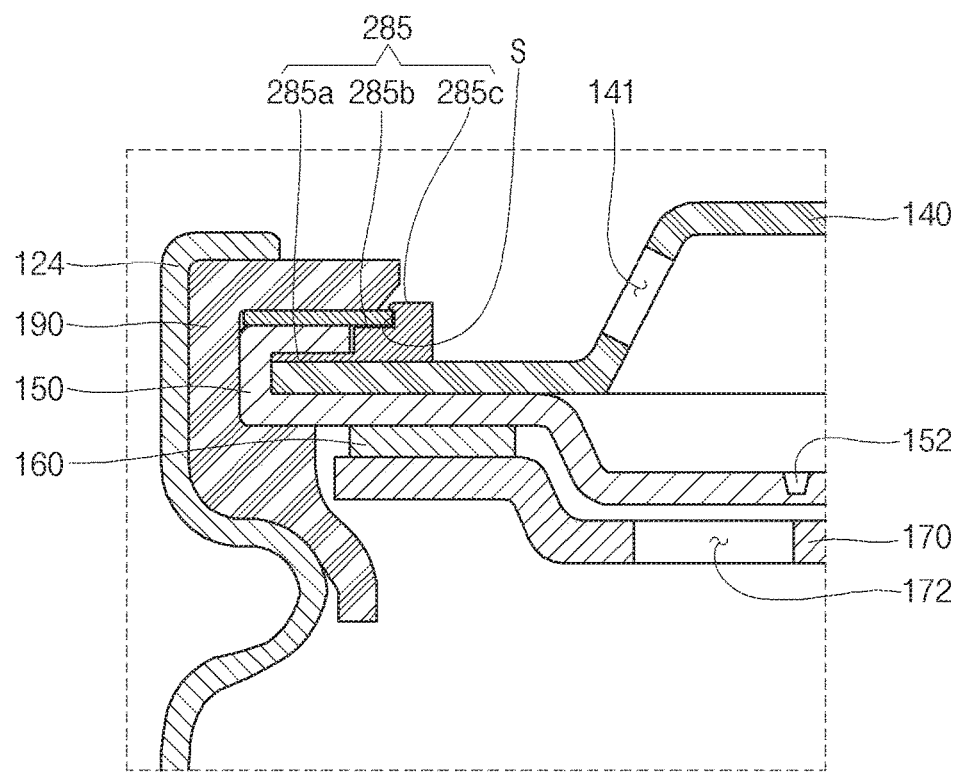
Figure 6:
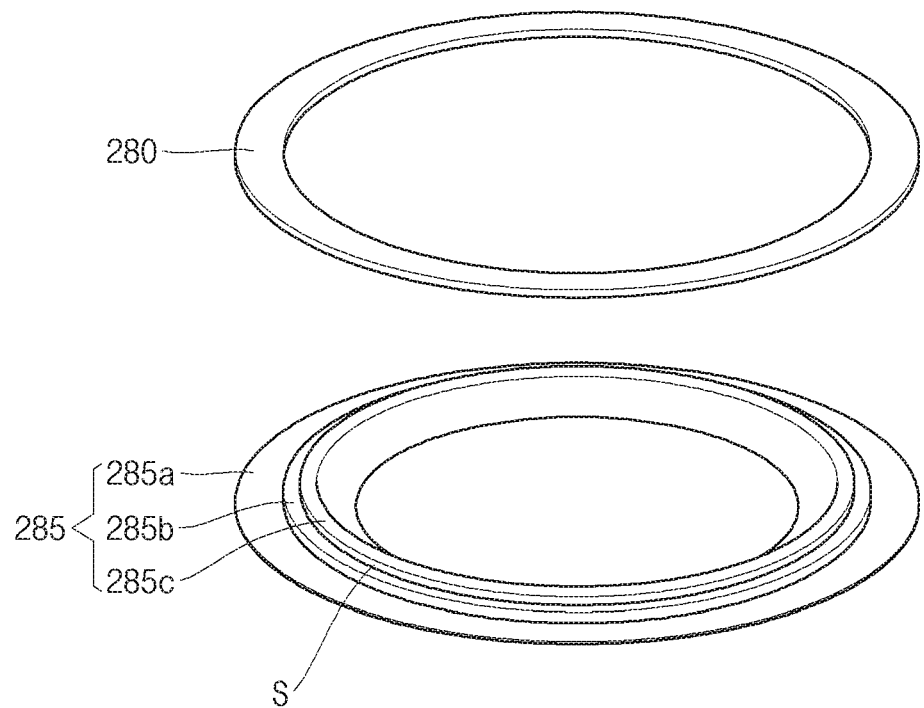
FIG. 6 is an exploded perspective view illustrating an insulation sheet and an upper insulator shown in FIG. 4.

FIGS. 4 and 5 are partially cross-sectional views of a secondary battery according to another embodiment of the present invention. FIG. 6 is an exploded perspective view illustrating an insulation sheet and an upper insulator shown in FIG. 4.

The secondary battery illustrated in FIG. 4 is substantially the same with the secondary battery illustrated in FIG. 2, and the following description will focus on differences therebetween.

Referring to FIGS. 4 and 5, the insulation sheet 280 is formed as a ring-shaped plate and is mounted on a cap-up 140. That is to say, the insulation sheet 280 is positioned on a safety vent 150 surrounding the edge of the cap-up 140. The insulation sheet 280 may be formed by anodizing an aluminum sheet. In addition, an upper insulation member 285 may further be formed between the insulation sheet 280 and the cap-up 140. The insulation sheet 280 is inserted into the upper insulation member 285 to then be fixed to the edge of the cap-up 140. The upper insulation member 285 is formed as a substantially ring-shaped plate and may be made of a resin material, such as polyethylene (PE), polypropylene (PP) or polyethylene terephthalate (PET). In addition, the upper insulation member 285 includes a first region 285a positioned between the cap-up 140 and the safety vent 150, a second region 285b positioned inside the first region 285a and formed to be higher than the first region 285a, and a third region 285c positioned inside the second region 285b and formed to be higher than the second region 285b. That is to say, the upper insulation member 285 is formed in a shape of a staircase having gradually decreasing heights away from the center. In addition, the insulation sheet 280 is inserted into a step s between the second region 285b and the third region 285c and is positioned on the second region 285b. Here, the height of the second region 285b is equal to that of the safety vent 150 positioned at the edge of the cap-up 140. Therefore, the insulation sheet 280 is mounted along an area extending between the safety vent 150 and the second region 285b. Thereafter, the insulation sheet 280 may be brought into close contact with the cap-up 140 by the gasket 190 and the crimping part 124 of the case 120.

Figure 7:
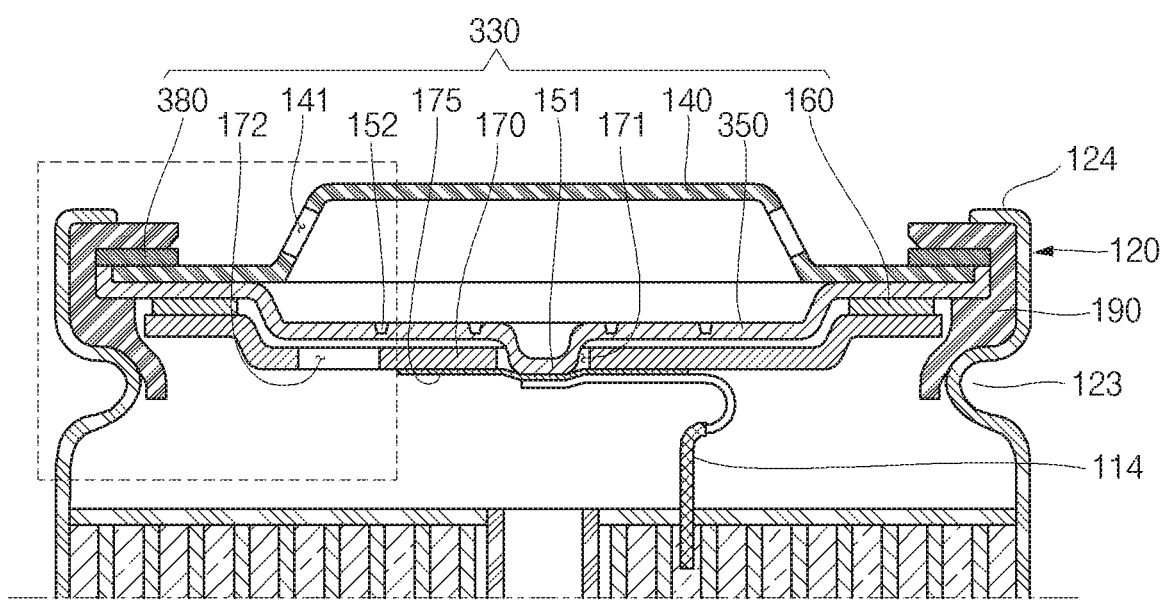
FIGS. 7 and 8 are partially cross-sectional views of a secondary battery according to still another embodiment of the present invention.
Figure 8:
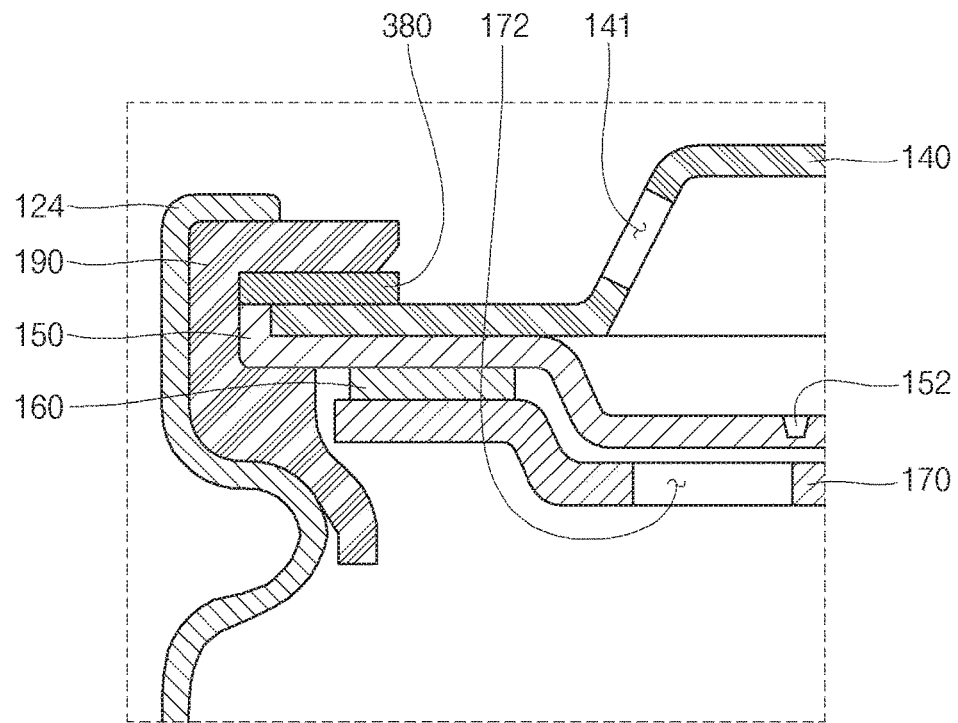

FIGS. 7 and 8 are partially cross-sectional views of a secondary battery according to still another embodiment of the present invention.

The secondary battery illustrated in FIG. 7 is substantially the same with the secondary battery illustrated in FIG. 2, and the following description will focus on differences therebetween.

Referring to FIGS. 7 and 8, the insulation sheet 380 is mounted on a cap-up 140. In detail, the insulation sheet 380 is mounted on the cap-up 140 and a safety vent 150 surrounding the edge of the cap-up 140. Here, the safety vent 350 is configured to surround the edger of the cap-up 140 while not extending to an upper portion of the cap-up 140. Therefore, the insulation sheet 380 may be mounted along an area extending between the cap-up 140 and the safety vent 350. In addition, the insulation sheet 380 may be fixed to the cap-up 140 by, for example, laser welding, ultrasonic welding, resistance welding or equivalents thereof. Of course, the insulation sheet 380 may also be fixed to the cap-up 140 using an adhesion member. In addition, the insulation sheet 380 may be formed by anodizing an aluminum sheet.

Figure 9:
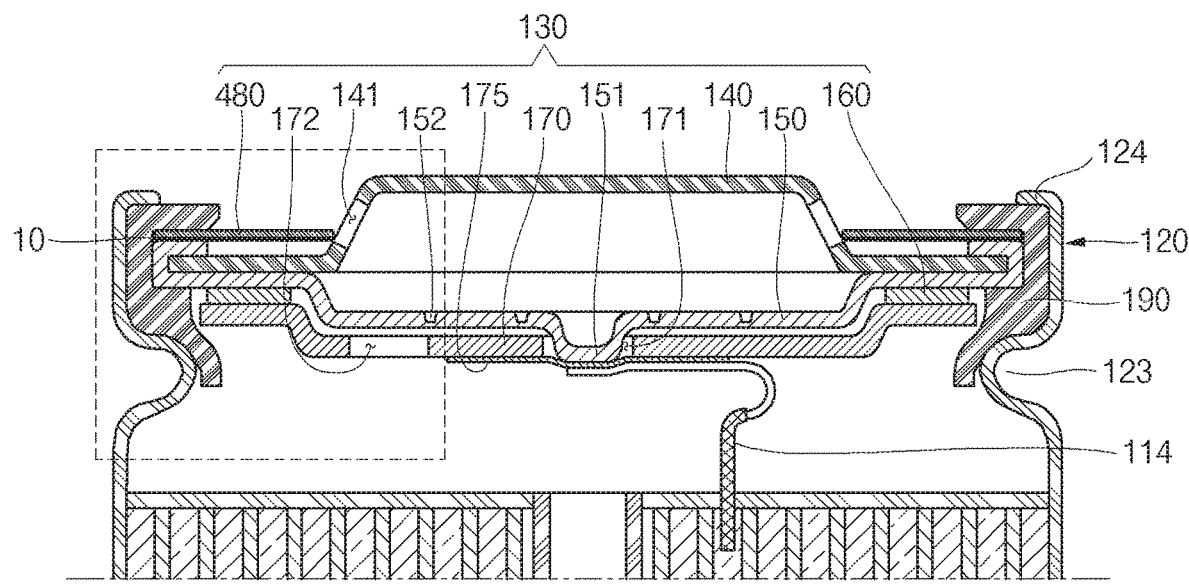
FIGS. 9 and 10 are partially cross-sectional views of a secondary battery according to still another embodiment of the present invention.
Figure 10:
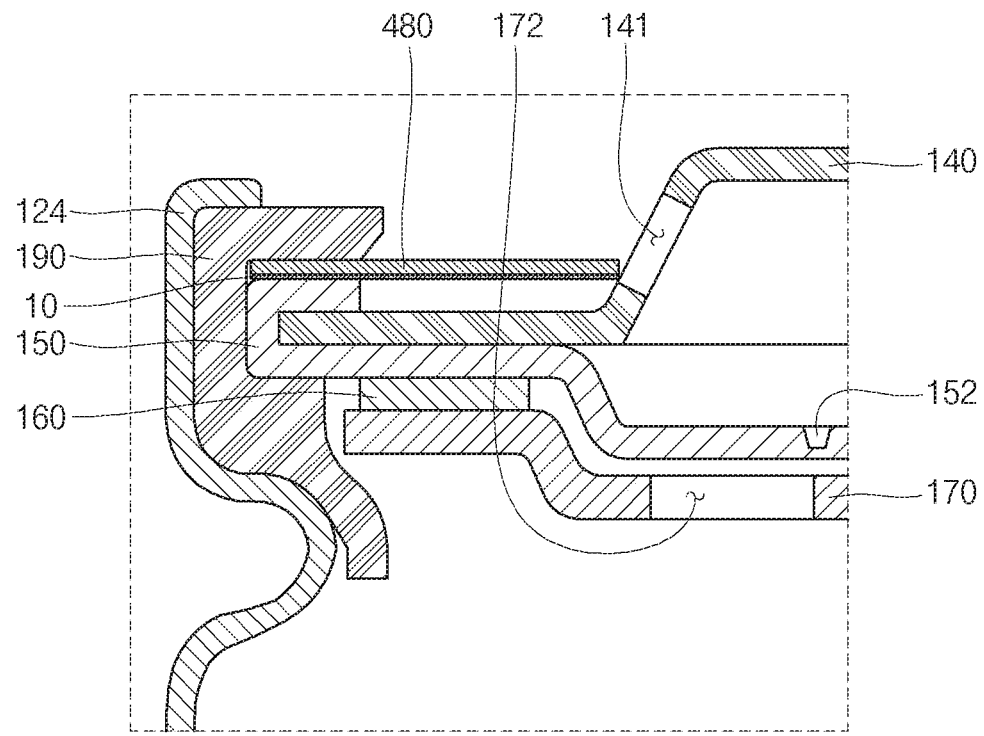
Figure 11:
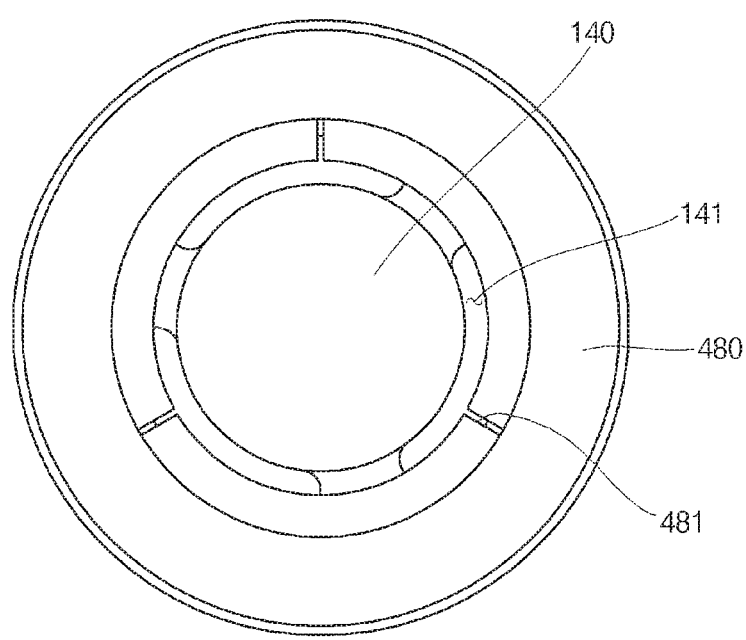
FIG. 11 is a plan view illustrating a state in which an insulation sheet is coupled to a cap-up in FIG. 9.

FIGS. 9 and 10 are partially cross-sectional views of a secondary battery according to still another embodiment of the present invention. FIG. 11 is a plan view illustrating a state in which an insulation sheet is coupled to a cap-up in FIG. 9.

The secondary battery illustrated in FIG. 9 is substantially the same with the secondary battery illustrated in FIG. 2, and the following description will focus on differences therebetween.

Referring to FIGS. 9 and 10, the insulation sheet 480 is formed as a ring-shaped plate and is mounted on a safety vent 150 surrounding an edge of a cap-up 140. In addition, the insulation sheet 480 is formed on the safety vent 150 to extend to the inside of the cap-up 140. Here, the insulation sheet 480 is formed to extend to an upwardly protruding part of the cap-up 140. That is to say, the insulation sheet 480 is inserted into the upwardly protruding part of the cap-up 140 to then be fixed to the cap-up 140. Of course, the insulation sheet 480 may also be fixed to a top portion of the safety vent 150 using an adhesion member 10. In addition, the insulation sheet 480 may be formed by anodizing an aluminum sheet. In addition, a plurality of cutting grooves 481 may be formed in an inner peripheral edge of the insulation sheet 480. The cutting grooves 481 may prevent the insulation sheet 480 from rising together with the safety vent 150 due to a protrusion part 151 of the safety vent 150 elevated by internal gases released when a short-circuit occurs to the secondary battery 400.

Although the foregoing embodiments have been described to practice the secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A secondary battery comprising:
an electrode assembly;
a case for receiving the electrode assembly;
a cap assembly coupled to the case at an upper end of the case;
a gasket interposed between the cap assembly and the case; and
an upper insulation member,
wherein the cap assembly comprises:
a cap-up;
a safety vent under the cap-up and extending above the cap-up to surround a periphery of the cap-up; and
an insulation sheet on an upper surface of the safety vent that is above the cap-up,
wherein the upper insulation member is interposed between the cap-up and the safety vent upwardly extending from the cap-up,
wherein the insulation sheet contacts the upper insulation member,
wherein the upper insulation member includes a first region positioned between the cap-up and the safety vent, a second region positioned inside the first region toward a center of the cap-up and being thicker than the first region, and a third region positioned inside the second region toward the center of the cap-up and being thicker than the second region, and
wherein the insulation sheet contacts a stepped portion of the upper insulation member between the second region and the third region thereof.

2. The secondary battery of claim 1, wherein the insulation sheet is interposed between the safety vent upwardly extending from the cap-up and the gasket.

3. The secondary battery of claim 1, wherein the insulation sheet is an anodized aluminum sheet.

4. The secondary battery of claim 1, wherein the insulation sheet is adhered to the safety vent using an adhesion member.

5. The secondary battery of claim 1, wherein the insulation sheet is adhered to the safety vent by welding.

6. The secondary battery of claim 1, wherein the insulation sheet extends from over the safety vent past a distal end of the gasket toward an upwardly protruding part of the cap-up.

7. The secondary battery of claim 1, wherein the insulation sheet comprises an outermost layer of aluminum oxide.

* * * * *